(12) United States Patent
Koester

(10) Patent No.: US 6,191,924 B1
(45) Date of Patent: *Feb. 20, 2001

(54) BEARING FOR AN ACTUATOR OF A DISC DRIVE

(75) Inventor: David D. Koester, Chanhassen, MN (US)

(73) Assignee: Seagate Technology LLC, Scotts Valley, CA (US)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/017,540

(22) Filed: Feb. 2, 1998

Related U.S. Application Data

(60) Provisional application No. 60/062,161, filed on Oct. 16, 1997.

(51) Int. Cl.$^7$ .................................. G11B 5/55; G11B 5/54
(52) U.S. Cl. ............................................. 360/260; 360/250
(58) Field of Search .................................. 360/106, 98.07, 360/99.04, 99.08, 260, 250; 384/610, 611

(56) References Cited

U.S. PATENT DOCUMENTS

| 4,682,255 | | 7/1987 | Sleger et al. ........................ 360/106 |
|---|---|---|---|
| 5,073,036 | * | 12/1991 | Sutton et al. ........................ 384/107 |
| 5,233,493 | | 8/1993 | Eliason .................................. 360/106 |
| 5,510,940 | * | 4/1996 | Tackling et al. ..................... 360/106 |
| 5,666,242 | * | 9/1997 | Edwards et al. ..................... 360/106 |
| 5,835,309 | * | 11/1998 | Boutaghou ........................... 360/106 |
| 5,978,180 | * | 11/1999 | Lee et al. ............................. 360/106 |

OTHER PUBLICATIONS

FIGS. 3–4 of specification (prior art).

* cited by examiner

Primary Examiner—Allen T. Cao
(74) Attorney, Agent, or Firm—Westman, Champlin & Kelly, PA

(57) ABSTRACT

An improved bearing cartridge to rotationally couple an actuator block supporting a plurality of heads to a chassis of a disc drive. The improved bearing cartridge having increased radial stiffness and including first and second concentrically aligned elongated sleeves. The first sleeve is coupled to the chassis and the second sleeve is coupled to the actuator block. The first and second sleeves are spaced to define a rotation gap therebetween. The bearing cartridge includes first and second spaced bearings positioned proximate to opposed ends of one of said first or second sleeves and at least one intermediate bearing spaced from the first and second bearings and positioned between the first and second bearings to rotationally connect the first and second sleeves.

18 Claims, 5 Drawing Sheets

BEARING FOR AN ACTUATOR OF A DISC DRIVE

CROSS-REFERENCE TO RELATED APPLICATION

This application claims priority to Provisional Application Ser. No. 60/062,161, filed Oct. 16, 1997, and entitled "Improved Radial Stiffness Actuator Bearing Cartridge".

FIELD OF THE INVENTION

The present invention relates to a disc drive storage system. In particular, the present invention relates to an improved bearing for rotationally supporting an actuator block carrying a plurality of heads for alignment relative to select data tracks of a disc.

BACKGROUND OF THE INVENTION

Disc drives are well known which store digital information in a plurality of circular, concentric data tracks of a disc. Discs are mounted on a spindle motor which causes the discs to spin and the surfaces of the discs to pass under heads carried by an actuator block movably coupled relative to the discs for selective access to data tracks of the discs. Heads carry transducers which read and write information to the disc surface. The actuator block is controlled via electronic circuitry coupled to the actuator drive for positioning the actuator block for aligning heads relative to selected data tracks.

Disc data density is increasing such that it is important to more accurately position heads relative to data tracks for retrieving selected information. The actuator block is rotationally coupled to the disc drive by a bearing which allows the actuator block to rotate about a rotation axis to move the actuator block along an arcuate path. Off-axis movement of the actuator block relative to or transverse to the rotation axis affects accurate head placement.

Thus, it is desirable to provide a bearing with sufficient stability to limit off-axis movement of the actuator block for precision head placement relative to selected data tracks. The present invention addresses these and other problems, and offers other advantages over the prior art.

SUMMARY OF THE INVENTION

The present invention relates to an improved bearing cartridge for rotationally coupling an actuator block supporting a plurality of heads to a chassis of a disc drive. The bearing cartridge includes first and second concentrically aligned elongated sleeves. The first sleeve is rigidly coupled to the chassis and the second sleeve is rigidly coupled to the actuator block. The first and second sleeves are spaced to define a rotation gap therebetween. The first and second sleeves are rotationally coupled by first and second spaced bearings positioned proximate to opposed ends of either the first or second sleeves and at least one intermediate bearing spaced from the first and second bearings along the longitudinal extent of the first and second sleeves between opposed ends thereof.

It should be understood that some details of the drawings have been exaggerated for clarity and the details of the drawings are not necessarily to scale.

DETAILED DESCRIPTION OF THE PREFERRED EMBODIMENTS

Figure 1:
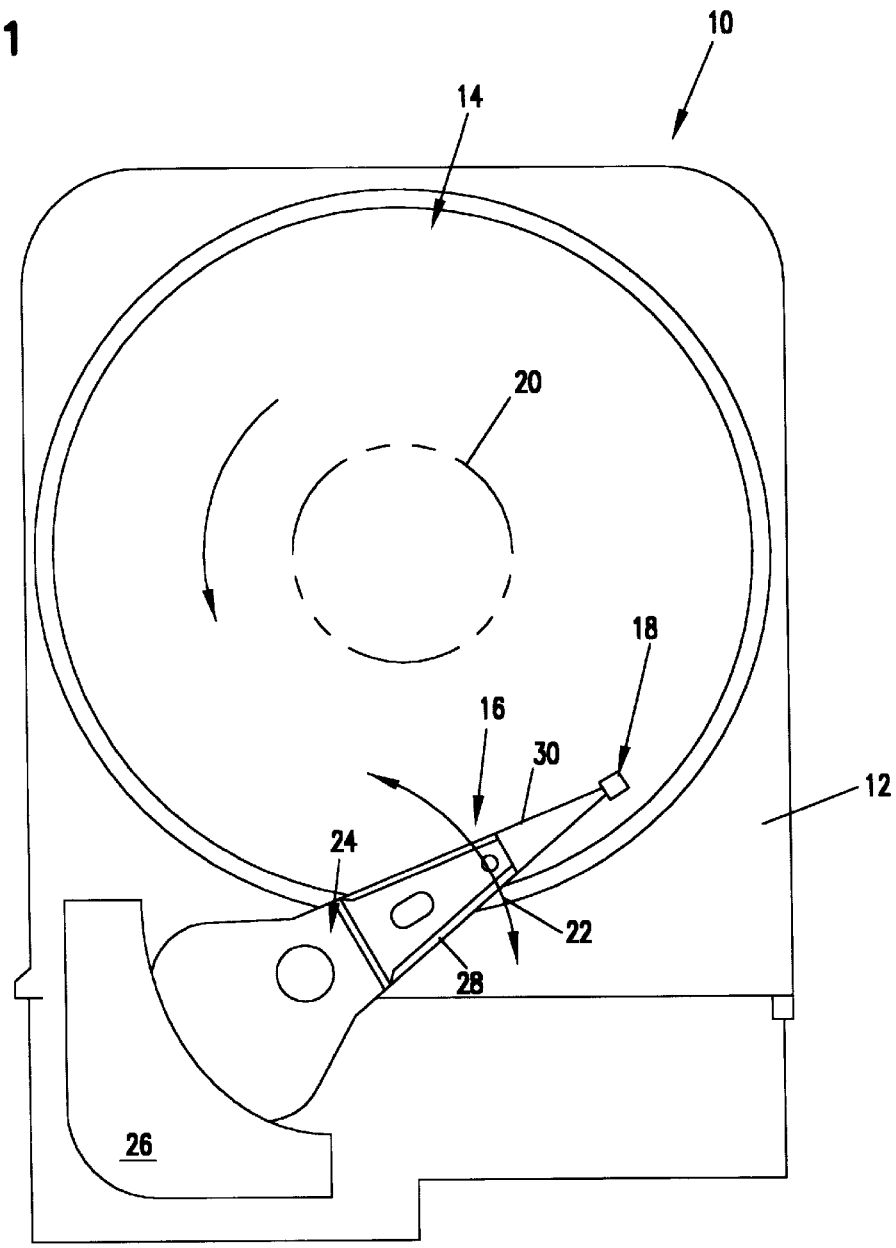
FIG. 1 is a plan view of a disc drive illustrating an actuator for placement of heads relative to discs.

FIG. 1 is a simplified plan view of a disc drive incorporating the present invention. As shown in FIG. 1, disc drive 10 includes a chassis 12, disc stack 14, rotary actuator 16, and heads 18. The disc stack 14 is rotationally supported relative to chassis 12 via a spindle motor 20. Heads 18 are supported relative to the actuator 16, which operates along an arcuate path as illustrated by arrow 22 for placement of the heads relative to the surfaces of discs. It should be understood that disc stack 14 may include any number of discs. Spindle motor 20 is coupled to electronic circuitry of the disc drive to rotate discs for operation.

Figure 2:
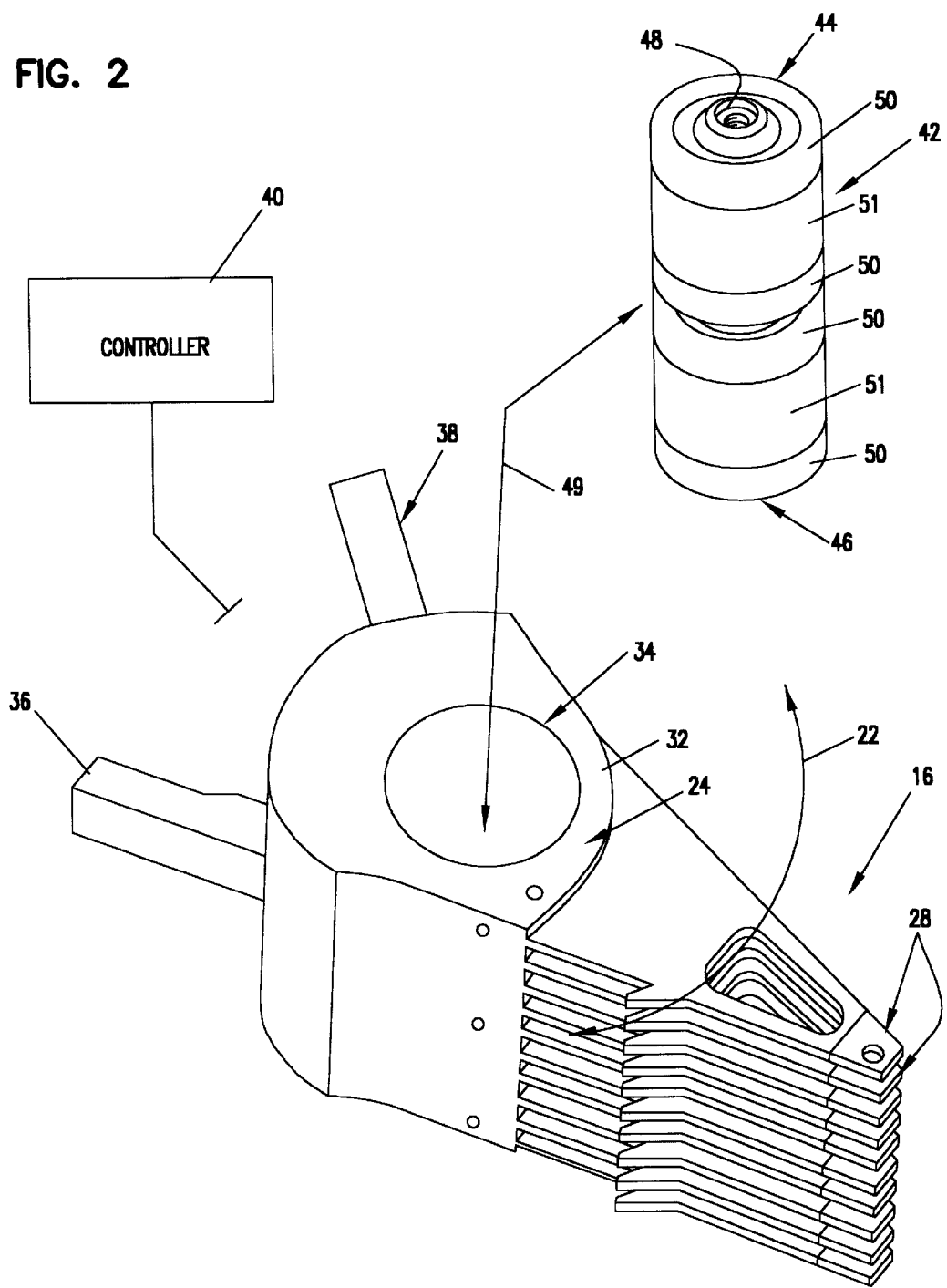
FIG. 2 is an exploded perspective view of an actuator block and controller coupled thereto shown schematically.

Actuator 16 includes an actuator block 24 which is rotationally coupled to chassis 12, as will be explained. Actuator block 24 is operated by a voice coil motor 26. Actuator block 24 includes actuator arms 28 (only single actuator arm 28 visible in FIG. 1) which support heads 18 via suspension assemblies 30. FIG. 2 is a perspective view of actuator block 24 including base 32 and a plurality of stacked actuator arms 28. Base 32 includes a bearing channel 34 and legs 36 and 38 for supporting the coil of a voice coil motor in a known manner.

Operation of the actuator block 24 is controlled via controller 40 (shown schematically). Bearing cartridge 42 including upper and lower ends 44, 46, extends through channel 34 to rotationally couple the actuator block 24 relative to chassis 12 of the disc drive. A fastener member (not shown) is inserted into threaded sockets 48 (only one visible in FIG. 2) at upper and lower ends 44, 46 to fixedly coupling the bearing cartridge 42 to the chassis 12. Axis 49 defines the rotation axis of the bearing cartridge 42 for movement of actuator block 24 along arcuate path 22.

As shown, the bearing cartridge 42 includes landings or raised portions 50 formed to and extending from an outer perimeter 51 of the bearing cartridge 42 at spaced locations to secure the bearing cartridge 42 to the actuator block 24. The diameter of the raised portions 51 is sized to provide an interference fit between the bearing cartridge 42 and bearing channel 34 to fixedly secure bearing cartridge for rotational operation of the actuator block 24. Preferably, raised portions 51 are formed of a roughened surface to enhance the connection between the bearing cartridge 42 and the actuator block 24. Although a particular number and arrangement of raised portions 51 is shown, it should be understood that alternate arrangements may be used to secure the bearing cartridge 42 to the actuator block 24. For example, the bearing cartridge 42 may also be fixed to the actuator block 24 via set screws not shown.

During operation, the controller 40 supplies current to operate the voice coil motor for precision placement of the heads relative to selected data tracks on discs 14. Operation of the voice coil motor rotates actuator block 24 about rotation axis 49 via bearing cartridge 42. It is important that the actuator 16 accurately move the actuator block 24 for precision placement of the heads to read and write data.

Figure 3:
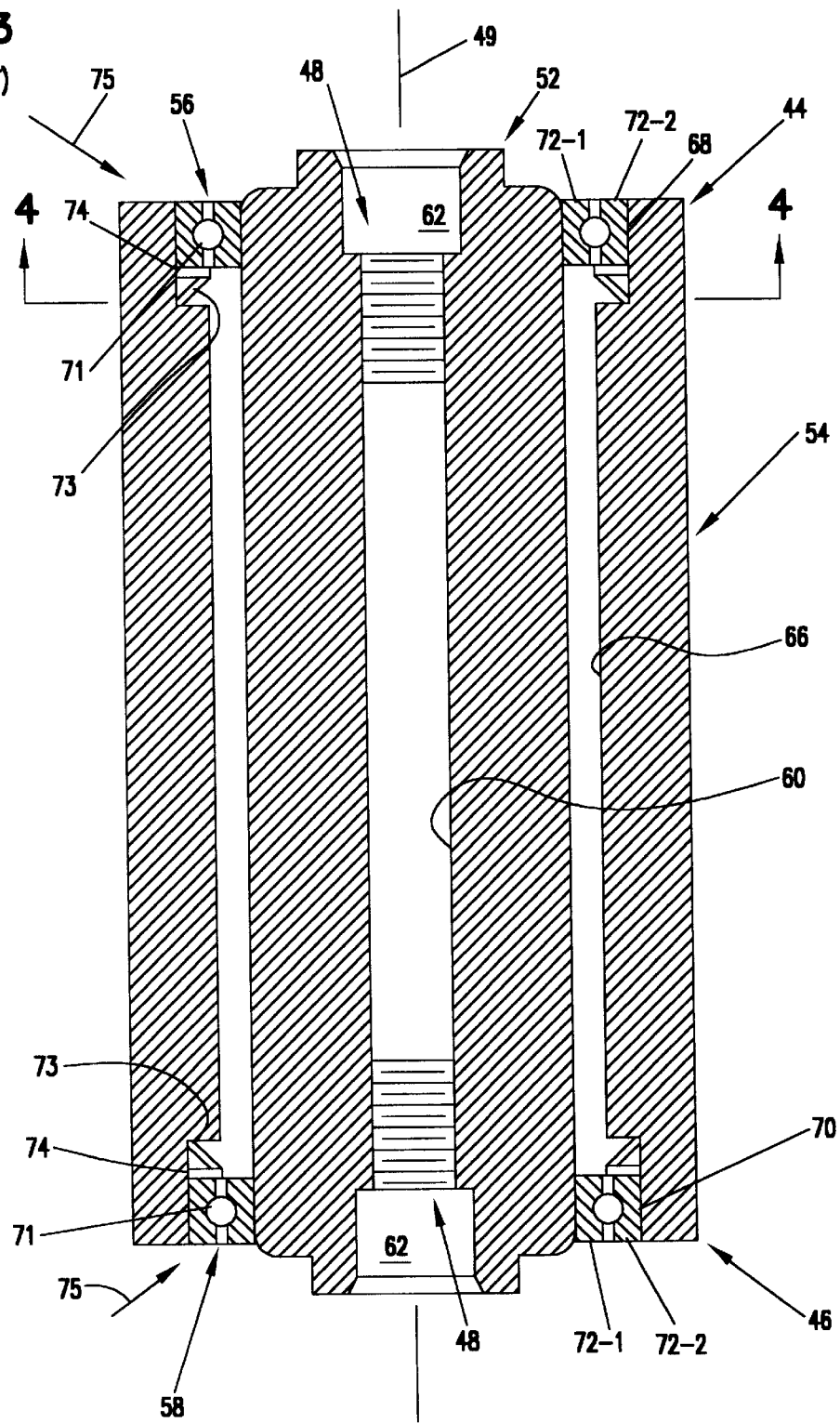
FIG. 3 is a cross-sectional view of a prior art bearing cartridge.
Figure 4:
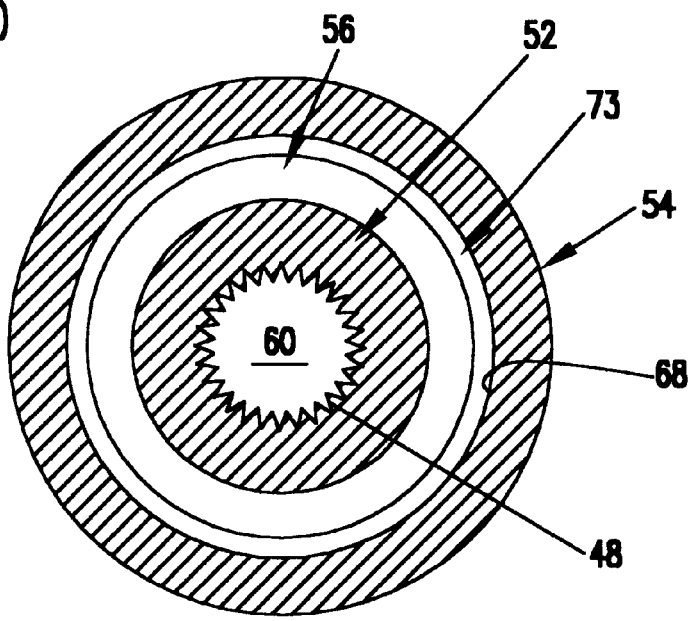
FIG. 4 is a cross-sectional view of a prior art bearing cartridge as taken along lines 4—4 of FIG. 3.

FIGS. 3–4 illustrate a prior art bearing cartridge 42-1 for supporting actuator block 24 for rotation about axis 49. As shown, the prior art bearing cartridge includes an inner sleeve 52 and an outer sleeve 54 concentrically aligned with inner sleeve 52. A longitudinal extent of the inner and outer sleeves 52, 54 is aligned with rotation axis 49. Inner sleeve 52 is fixedly coupled to chassis 12 of a disc drive via threaded sockets 48 by known threaded fastening members to define a rotation shaft for the actuator block 24. Outer sleeve 54 is fixedly coupled as previously explained (or may be integrally formed) to the actuator block 24 and movable therewith. Inner and outer sleeves 52, 54 are rotationally coupled by bearings 56, 58 (shown schematically) to allow relative motion of actuator block 24 relative to chassis 12 as will be explained.

Inner and outer sleeves 52, 54 are spaced to define a rotation gap between the inner and outer sleeves 52, 54. Bearings 56, 58 rotationally connect inner and outer sleeves generally at opposed ends of the sleeves 52, 54. In particular, housings of bearings 56, 58 are rigidly connected to both the inner and outer sleeves 52, 54 to provide a rotational connection between inner and outer sleeves 52, 54. The rigid connection of bearings 56, 58 to inner and outer sleeves 52, 54 provides fixture points which limit transverse motion of the actuator block 24 relative to the rotation axis 49, while operation of bearings 56, 58 facilitates rotational motion of the actuator block 24 about axis 49 to move heads 18 along the arcuate path 22. The fixture points between inner and outer sleeves 52, 54 extend along a limited portion. The remaining portion between inner and outer sleeves 52, 54 is separated by the rotation gap. Bearings 56, 58 are preloaded for precision rotation of rotating elements within the bearing housing to limit bearing vibration and noise.

Inner and outer sleeves 52, 54 are formed elongated tubular members. The tubular member of inner sleeve 52 defines an inner through bore 60. Threaded sockets 48 are formed along the length of the through bore 60. Opposed ends of the through bore 60 include countersunk portions 62 for recessing the fastener member connecting inner sleeve 52 to chassis 12.

The tubular member of outer sleeve 52 forms a through bore having a first inner diameter portion 66 and stepped second inner diameter portions 68, 70. The first diameter portion 66 is sized to define the rotation gap between the concentrically aligned inner and outer sleeves 52, 54. The rotation gap between the inner and outer sleeves 52, 54 is small to provide sufficient rigidity to limit vibration and noise. If the rotation gap is too large, off-axis movement between the inner and outer sleeves 52, 54 increases.

The stepped second diameter portions 68, 70 define bearing gaps between the concentrically aligned inner and outer sleeves 52, 54 for supporting bearings 56, 58. The second diameter portions 68, 70 are arranged at opposed ends of outer sleeve 54 to support the bearings 56, 58 proximate to the ends of outer sleeve 54. The second diameter portions 68, 70 are sized so that the bearing gap defined between inner and outer sleeves 52, 54 provides a clearance fit for bearings 56, 58 between the inner and outer sleeves 52, 54. Bearings 56, 58 are inserted into the bearing gap between the inner and outer sleeves 52, 54; and the bearing housings are glued to the inner and outer sleeves 52, 54 to provide a rigid connection between the bearing housing and inner and outer sleeves 52, 54.

The extent of the second diameter portions 68, 70 generally corresponds to the length of the bearings 56, 58 along the longitudinal axis 49. Preferably, as shown bearings 56, 58 are ball bearings including a ball 71 and inner and outer races 72-1, 72-2. Ball 71 rotates with inner and outer races 72-1, 72-2 for operation of the bearing in a known manner. Cone-ring-shaped or Bellville springs 73 are supported in the bearing gap defined by stepped diameter portions 68, 70 and are aligned to contact a washer 74 flush against outer race 72-2 to provide a transverse preload force to bearings 56, 58 along an axis illustrated by arrow 75 to limit off-axis movement of bearings 56, 58.

Figure 6:
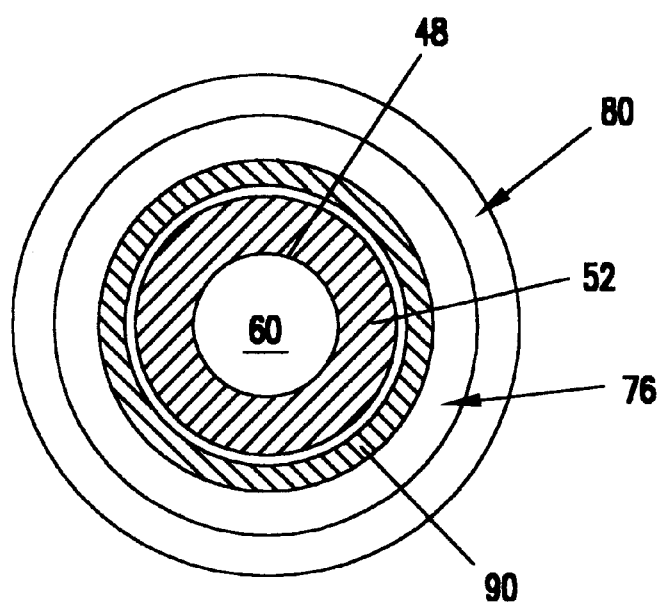
FIG. 6 is a cross-sectional view of an embodiment of a bearing cartridge of the present invention as taken along lines 6—6 of FIG. 5.
Figure 5:
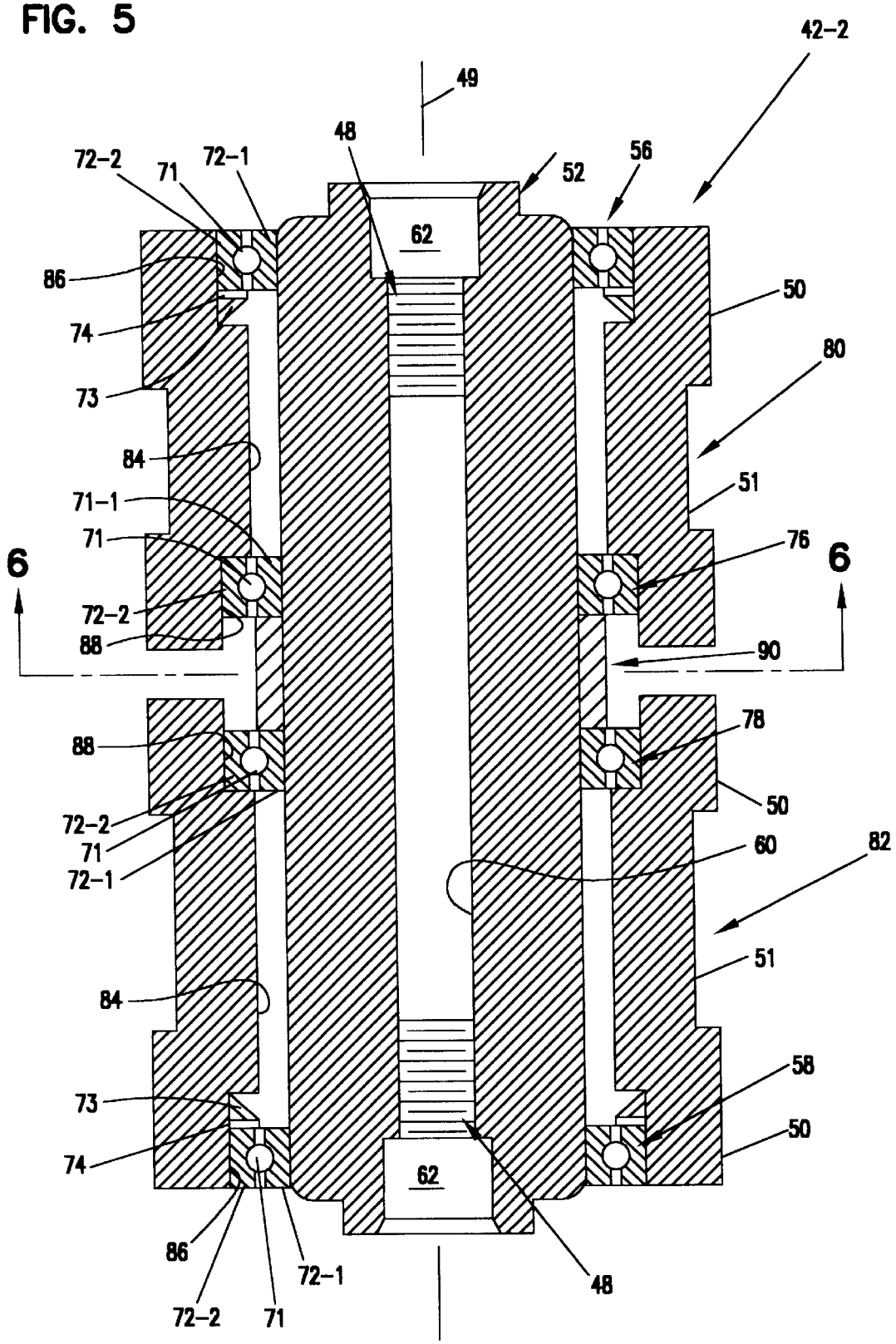
FIG. 5 is a cross-sectional view of an embodiment of a bearing cartridge of the present invention.

As previously explained, it is desirable to limit off-axis motion and vibration of the bearing cartridge for precision actuator block 24 placement. Off-axis or transverse motion and vibration affects operation of servo system electronics, causing control error in head placement. Thus it is desirable that a bearing cartridge limit off-axis movement for the servo system electronics to work properly and for the heads to maintain accurate positions relative to selected data tracks. FIGS. 5–6 illustrate an embodiment of a bearing cartridge 42-2 of the present invention. Like numbers refer to like parts of bearing cartridge 42-1 illustrated in FIGS. 3–4. As shown, bearing cartridge 42-2 includes intermediate bearings 76, 78, located between bearings 56, 58 along the longitudinal axis 49, for enhanced performance as will be explained.

As shown, bearing cartridge 42-2 includes inner sleeve 52 and outer sleeve portions 80, 82. As previously explained, inner sleeve 52 is formed of an elongated tubular member having through bore 60. Outer sleeve portions 80, 82 are formed of shortened tubular members which collectively define an outer sleeve which is fixed to the actuator block 24. Each tubular member has a length less than the length of inner sleeve 52 so that multiple sleeve portions 80, 82 fit along the length of inner sleeve 52. The sleeve portions 80, 82 each have a first inner diameter portion 84 and stepped second inner diameter portions 86, 88 at opposed ends of portions 80, 82. The first diameter portions 84 are sized to define the rotation gap between the inner and outer sleeve portions as previously explained.

Opposed stepped second diameter portions 86, 88 of sleeve portions 80, 82 define a bearing gap between the inner and outer sleeves 52, 54 for supporting bearings 56, 58 and intermediate bearings 76. 78. The second diameter portions 86 are sized so that the bearing gap defined between the inner and outer sleeves 52, 54 provides a clearance fit for bearings 56, 58. The second diameter portions 86 are arranged to provide a bearing gap proximate to opposed ends of the outer sleeve defined by sleeve portions 80, 82. The second diameter portions 88 are sized so that the bearing gap defined between the inner and outer sleeves 52, 54 provides an interference fit for intermediate bearings 76, 78.

Spacer ring 90 is included between sleeve portions 80, 82. Spacer ring 90 includes an inner opening sized to extend about inner sleeve 52. Spacer ring 90 is supported about inner sleeve 52 between sleeve portions 80, 82 and intermediate bearings 76, 78 to provide axial support between intermediate bearings 76, 78 and sleeve portions 80, 82 and to preload bearings 76, 78 as will be explained.

The bearing cartridge 42-2 is constructed by initially, sliding spacer ring 90 over inner sleeve 52. Bearing housings 76, 78 are glued to outer sleeves 80, 82, respectively. Thereafter, intermediate bearings 76, 78 and outer sleeves 80, 82 are mounted over inner sleeve 52 adjacent to opposed ends of spacer ring 90. Prior to sliding outer sleeves 80, 82 (having bearings 76, 78 coupled thereto), glue is applied to inner sleeve 52 at selected locations to align with bearing housings 76, 78 supported via sleeves 80, 82. A load is supplied to outer sleeves 80, 82 to attach the bearing housings 76, 78 to sleeve 52. Thus, as described, the housings of intermediate bearings 76, 78 are rigidly coupled to inner and outer sleeves 52, 54. Glue is applied to inner and outer sleeves 52, 80, 82 at the bearings gaps formed by the second diameter portions 86 and inner sleeve 52 and bearings 56, 58 are inserted into the bearing gaps and a load is supplied to attach bearing housings 56, 58 to inner and outer sleeves to provide a rigid connection.

As previously explained, bearings 56, 58 are preloaded via cone-ring or Bellville springs 73 received in bearing gaps formed between sleeve portions 80, 82 and inner sleeve 52 at stepped diameter portions 86. This preload force is transferred to intermediate bearings 76, 78 bearings 76, 78 via cooperation of sleeve portions 80, 82 and spacer ring 90. The preload force supplied to the bearings limits vibration and noise during operation of the bearings. Preferably, the pre-load force is approximately 2–4 pounds (0.9-1.8 kilograms).

In particular, springs 73 are aligned with outer race 72-2 of bearings 56, 58 and ring 90 is aligned with inner race 72-1 of bearings 75, 78 to provide a transverse pre-load to limit operation noise and vibration of the bearings. Alternate device may be used to pre-load the bearings including, for example, coil springs, a rubber or elastomeric ring, or gas filled ring. Alternatively, it should be understood that preload springs may be also included in bearing gap defined by stepped diameter portions 88 to supply a biasing force to bearings 76, 78.

Thus, as described, the design of the embodiment of the bearing cartridge 42-2 shown in FIGS. 5–6 provides additional fixture points along the longitudinal length of the inner and outer sleeves. The cartridge design of the present invention increases the radial stiffness along the length of the bearing cartridge to reduce errors in head placement and increases the natural frequency of the actuator, thus increasing the operating bandwidth of the actuator system. Bode plots for an actuator including a bearing cartridge of the present invention show a decreased gain of the open loop servo for more accurate head placement. Although, the bearing cartridge is shown with a magnetic-type disc drive, the invention is not limited to a magnetic disc drive. Preferably, bearings 56, 58, 76, 78 are ball bearings, but it should be understood that the invention is not so limited. Although inner sleeve 52 is shown to include an elongated tubular construction, it should be understood that the inner sleeve is not limited to such a construction and that inner sleeve 52 may be formed of a solid member. Additionally, FIG. 5 shows threaded sockets 48 at opposed ends of the inner sleeve, and it should be understood that the invention is not limited to threaded sockets 48 at opposed ends and other designs may be adapted to support the bearing cartridge 42 relative to the chassis 12 and actuator block 24.

Thus, as illustrated in the embodiment of the bearing cartridge 42-2 of the present invention, opposed spaced bearings 56, 58 are positioned toward opposed ends of the inner and outer sleeves to define end fixture positions and intermediate bearings 76,78 are positioned between the opposed spaced bearings 56, 58 to provide additional radial fixture points to limit transverse or off-axis motion for precision head placement. Although, bearings 56, 58 couple to ends of the inner and outer sleeves, the invention is not so limited and bearings may support the inner and outer sleeves proximate to the ends of either the inner or outer sleeves.

The present invention discloses a bearing cartridge 42-2 adapted to rotationally support an actuator block 24 of a disc drive 10. The bearing cartridge 42-2 includes a first sleeve 52 adapted to fixedly couple to the chassis 10 of a disc drive, a second sleeve concentrically aligned about the first sleeve 52 and a bearing assembly for rotationally coupling the first and second sleeves. The bearing assembly includes bearings 56, 58 located proximate to opposed ends of the sleeves and at least one intermediate bearing 76, 78 spaced from the first and second bearings 56, 58 between the first and second bearings to rotationally connect the sleeves.

It is to be understood that even though numerous characteristics and advantages of various embodiments of the present invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application while maintaining substantially the same functionality without departing from the scope and spirit of the present invention. In addition, although the preferred embodiment shown herein is directed to a magnetic disc drive system, it will be appreciated by those skilled in the art that the teachings of the present invention can be applied to other systems, such as an optical drive system without departing from the scope and spirit of the present invention.

What is claimed is:

1. A rotary-actuated disc drive comprising:
   a disc rotatably coupled to a chassis of a disc drive;
   an actuator including an actuator block supporting heads relative to a disc surface and motor operably coupled to the actuator block to rotationally move the actuator block for aligning the heads relative to selected locations of the disc surface, said actuator block being rotationally coupled to the chassis via a
   a bearing assembly comprising a fixed portion and a rotating portion and including first and second spaced bearings positioned proximate to opposed ends of the at least one of said fixed or rotating portions and at least one intermediate bearing between the first and second bearings each of the first and second spaced bearings and the at least one intermediate bearing including a rotating bearing element rotatable within a housing between first and second housing members to provide rotational connections between the fixed and rotating portions proximate to opposed ends of the at least one of the fixed or rotating portions and at an intermediate position between the first and second spaced bearings.

2. The rotary-actuated disc drive of claim 1 wherein the fixed portion is arranged to define an inner portion and the rotating portion is arranged to define an outer portion with the outer portion encircling the inner portion.

3. The rotary-actuated disc drive of claim 2 wherein the inner portion includes at least one threaded socket for securing the inner portion to the chassis.

4. The rotary-actuated disc drive of claim 1, further comprising:
   means for supplying a biasing force to the bearings rotationally coupling the fixed portion and the rotating portion.

5. The rotary-actuated disc drive of claim 4 wherein the means for supplying a biasing force includes a spring.

6. The rotary-actuated disc drive of claim 2 wherein the outer portion includes first and second sleeve portions, the first and second sleeve portions including a first inner diameter portion and stepped second inner diameter portions at opposed ends of the first and second sleeve portions, the first diameter portion being sized to define a rotation gap between the fixed portion and the rotating portion, and the second diameter portions being sized to define a bearing gap between the fixed portion and the rotating portion to support bearings.

7. The rotary-actuated disc drive of claim 6 wherein a plurality of intermediate bearings are included between the first and second bearings which fit into a plurality of bearing gaps between the fixed portion and the rotating portion.

8. The rotary-actuated disc drive of claim 7 and including a spacer ring between the first and second sleeve portions.

9. A bearing cartridge for a disc driving comprising:
 a first sleeve having opposed ends;
 a second sleeve having opposed ends, the first and second sleeves being formed of concentrically aligned tubular members spaced to define a rotation gap therebetween; and
 a bearing assembly for rotationally coupling the first and second sleeves, the bearing assembly including first and second spaced bearings positioned proximate to opposed ends of at least one of the first or second sleeves and at least one intermediate bearing spaced from the first and second bearings along a longitudinal extent of the first or second sleeves between the first and second bearings, each of the first and second spaced bearings and the at least one intermediate bearing including a rotating bearing element rotatable within a housing between first and second housing members to provide a rotational connection between the first and second sleeves proximate to spaced opposed ends of the at least one of the first or second sleeves and at an intermediate position between the first and second spaced bearings.

10. The bearing cartridge of claim 9 wherein said first sleeve is arranged to define an inner sleeve and the second sleeve is arranged to define an outer sleeve, said outer sleeve encircling the inner sleeve.

11. The bearing cartridge of claim 10 wherein the inner sleeve includes at least one threaded socket for securing the inner sleeve to a chassis of a disc drive.

12. The bearing cartridge of claim 9, further comprising:
 means for supplying a biasing force to the bearings rotationally coupling the first and second sleeves.

13. The bearing cartridge of claim 12 wherein the means for supplying a biasing force includes a spring.

14. The bearing cartridge of claim 10 wherein the outer sleeve includes first and second sleeve portions, said first and second sleeve portions including a first inner diameter portion and stepped second inner diameter portions at opposed ends of the first and second sleeve portions, said first diameter portion being sized to define a rotation gap between the inner and outer sleeves; and the stepped second diameter portions being sized to define a bearing gap between the inner and outer sleeves to support bearings.

15. The bearing cartridge of claim 14 wherein a plurality of intermediate bearings are included which are supported in a plurality of bearing gaps between the inner and outer sleeves.

16. The bearing cartridge of claim 15 and including a spacer ring between the first and second sleeve portions.

17. A method for assembling a bearing cartridge for a disc comprising the steps of:
 (a) providing first and second outer sleeve portions having an inner diameter sized to fit over an inner sleeve and provide a rotation gap therebetween;
 (b) mounting at least one intermediate bearing over the inner sleeve and positioning the intermediate bearing between opposed ends of the inner sleeve;
 (c) mounting the first and second outer sleeve portions over the inner sleeve to assemble the first and second outer sleeve portions in rotational alignment with the inner sleeve; and
 (d) mounting first and second bearings between the assembled inner and outer sleeves proximate to ends of at least one of said inner or outer sleeves.

18. The method of claim 17 and including a spacer ring having a central opening sized to extend about the inner sleeve, wherein the method further comprises a step of:
 (e) mounting the spacer ring about the inner sleeve prior to mounting the intermediate bearing and the first and second outer sleeve portions.

* * * * *